United States Patent [19]
Aoyagi et al.

[11] Patent Number: 5,105,401
[45] Date of Patent: Apr. 14, 1992

[54] REPRODUCTION SYSTEM FOR SELECTING RECORDED INFORMATION BASED ON PREVIEW THEREOF

[75] Inventors: Yoshio Aoyagi; Hiroyuki Abe, both of Saitama, Japan

[73] Assignee: Pioneer Electronic Corporation, Tokyo, Japan

[21] Appl. No.: 417,159

[22] Filed: Oct. 4, 1989

[30] Foreign Application Priority Data

Dec. 5, 1988 [JP] Japan ................................. 63-306162

[51] Int. Cl.⁵ ............................................. G11B 27/10
[52] U.S. Cl. ......................................... 369/32; 369/47; 360/72.2
[58] Field of Search ................. 360/72.1, 72.2, 8, 10.1; 369/60, 47, 32, 33, 34, 49

[56] References Cited

U.S. PATENT DOCUMENTS 4,180,838 12/1979 Fehrenkamp ..................... 369/49 X
4,787,073 11/1988 Masaki .................................. 369/32

FOREIGN PATENT DOCUMENTS 3100278 4/1982 Fed. Rep. of Germany .
3629480 3/1988 Fed. Rep. of Germany .
62-8388 6/1987 Japan .

Primary Examiner—Robert L. Richardson
Attorney, Agent, or Firm—Sughrue, Mion, Zinn, Macpeak & Seas

[57] ABSTRACT

A system for storing information representing at least one data item selected for playback from a plurality of data items recorded on a recording medium. The system includes playing back one of the plurality of recorded data items for a predetermined period of time at a fast playback speed which is greater than a normal playback speed used during normal playback of a data item to determine if the data item being played back at the fast playback is to be subsequently played back at the normal playback speed, storing information representing the data item being played back in a memory only if the played back data item is to be subsequently played back at the normal playback speed, and repeating the playing back and storing for each of the plurality of recorded data items so that information representing each of the plurality of recorded data items which is to be subsequently played back at the normal playback speed is stored in the memory.

13 Claims, 3 Drawing Sheets

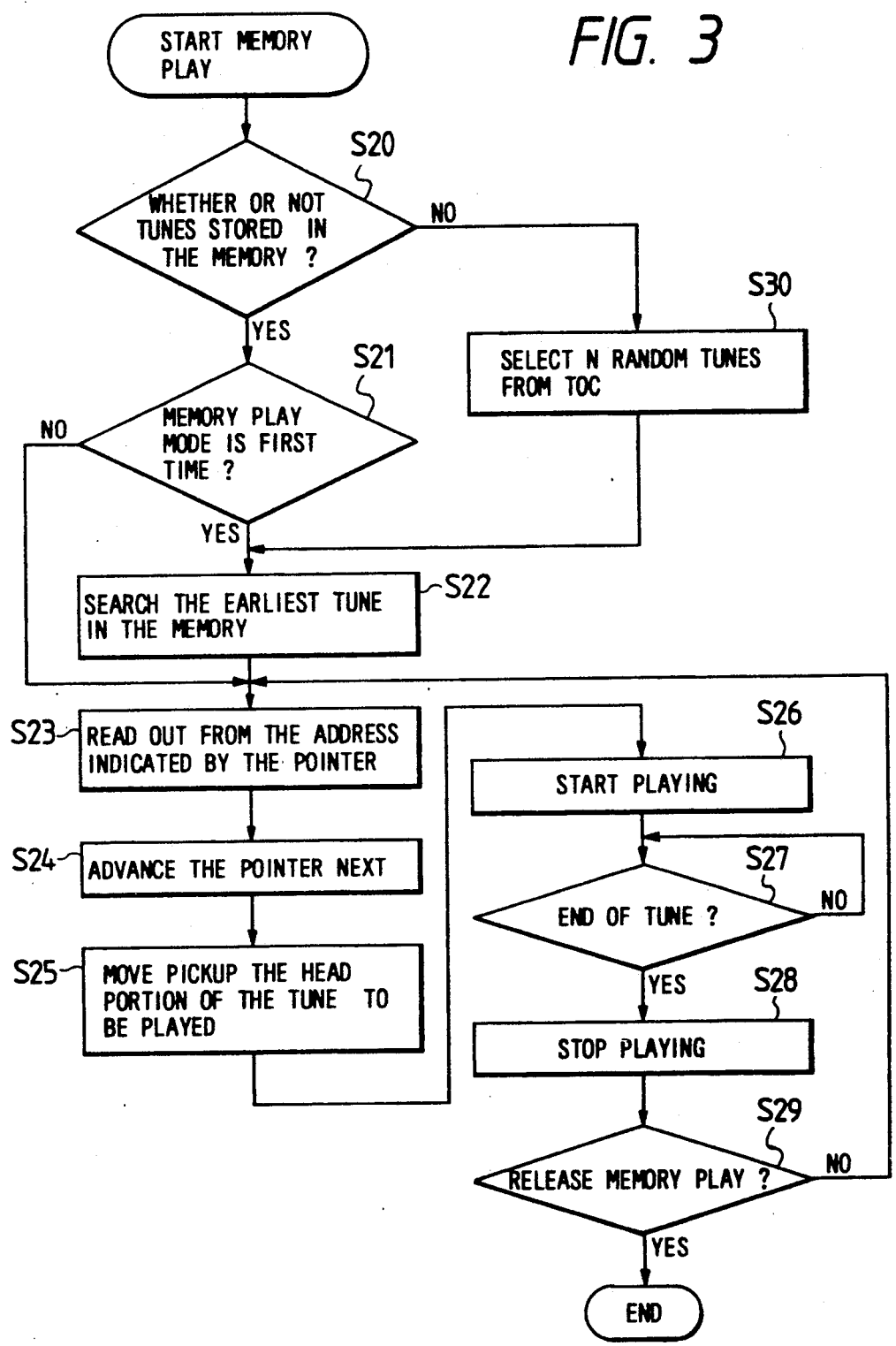

REPRODUCTION SYSTEM FOR SELECTING RECORDED INFORMATION BASED ON PREVIEW THEREOF

FIELD OF THE INVENTION

The present invention relates to a record information reproducing system in which desired items of program information are selected from a plurality of items of program information recorded on a recording medium, and information representing the selected items of program information are stored in a memory.

BACKGROUND OF THE INVENTION

A system is known for reproducing items of program information from a recording medium having a plurality of items of program information recorded thereon, in which desired items of program information are previously selected and information representing the selected items is stored in a memory. The items of program information recorded o the recording medium are then successively reproduced according to the information stored in the memory.

As a system for selecting desired items of program information, there is known, for example, a system in which an item number for a program information is assigned by means of a numerical key. Further, a system is known in which the respective head portions (i.e., initial recorded portions) of all the items of recorded program information are successively reproduced, each for a fixed time and desired items of program information are assigned by operating specific actuators during a reproducing operation (Japanese Patent Unexamined Publication No. 62-8388).

However, the system for selecting desired items of program information by means of numerical keys is disadvantageous since the selection of items of program information is performed while observing a list of titles of all of the items of program information recorded on the recording medium, and therefore it is difficult to select desired program information while confirming the contents thereof. Further, in the system of successively reproducing the respective head portions of the items of program information, each for a fixed time (e.g., 10 seconds) so as to select desired items of program information, a problem exists in that it is sometimes impossible to confirm the contents of the program information because the fixed time is so limited. More particularly, this problem occurs in cases where a long period of time exists between a start position of the program information and a position where data is actually recorded. It is of course possible to confirm the contents if the time for reproduction is increased; however, this would increase the time it takes for successively reproducing the head portions of all the items of program information, and therefore the function of selecting desired ones of the plurality of recorded items of program information would be troublesome (i.e., it would take too long).

SUMMARY OF THE INVENTION

It is therefore an object of the present invention to provide a record information reproducing system in which desired items of program information can be selected within a relatively short time while still being able to confirm the contents of program information.

The present invention solves this and other objects by providing a system which, when desired ones of the plurality of items of program information recorded on a recording medium are selected, the selection is performed in a manner so that respective head portions of all the items of program information recorded on the recording medium are successively reproduced for a fixed time at a speed which is higher than the speed used during a normal reproducing operation, and data representing the program information during the high speed reproduction are stored in a memory by operating specific actuators.

In order to select desired ones of the plurality of items of program information recorded on a recording medium and store the selected program information in a memory, first, a mode in which head portions of all of the items of program information recorded on the recording medium ar successively reproduced for a fixed time, and, in the reproducing operation, a specific actuator is operated so that data, for example, the start address information representing the item of program information which is being reproduced at that time is stored in the memory. In this case, in order that the contents of the program information can be recognized in the limited fixed time, the head portions of all of the items of program information are reproduced at a speed which is higher than that in the normal reproducing operation but at which the contents of the program information can still be discriminated.

When the program information corresponding to the address data stored in the memory is to be reproduced, the data representing the respective items of program information to be reproduced are read out from the memory in the order of storage, and normal reproducing of the items of program information to be reproduced is started from the head position of program information on the basis of the read-out data.

BRIEF DESCRIPTION OF THE DRAWINGS

FIGS. 2 and 3 are flowcharts for explaining the operation of the embodiment of FIG. 1.

DETAILED DESCRIPTION OF THE INVENTION

Figure 1:
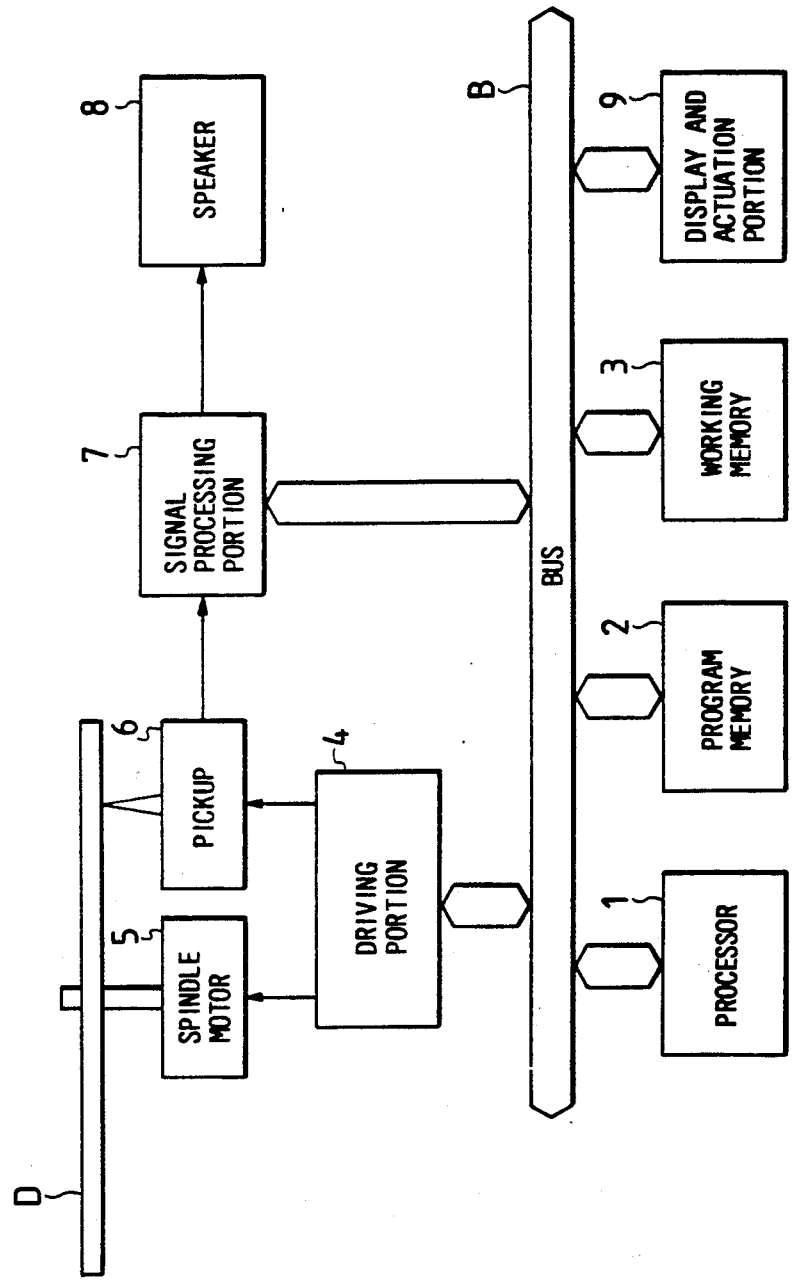
FIG. 1 is a block diagram showing the configuration of an embodiment of the record information reproducing system according to the present invention.

FIG. 1 is a block diagram showing the configuration of a digital audio disk player according to an embodiment of the present invention.

In this embodiment, a processor 1 is controlled in accordance with a program stored in a program memory 2 so as to control various circuits through a bus B to reproduce or play program information (data items) recorded on a disk D (hereinafter referred to as "music information"). A working memory 3 serves to temporarily store data to be processed by the processor 1, and a part of the region of the working memory 3 is used as a memory for storing information representing desired music information selected from the plurality of items of music information recorded on the disk D.

The disk D is driven to rotate at a constant linear speed by a spindle motor 5 which is controlled by a driving portion 4. In the case of a compact disk player, the linear speed is between about 1.2 m/s–1.4 m/s, and the number of revolutions is about 500 at the inner circumference and about 200 at the outer circumference.

The information recorded on the disk D is read by a photo pickup 6 and is supplied in the form of an RF signal to a signal processing portion 7. In the signal processing portion 7, the RF signal is amplified, converted into a binary signal, and then separated into a control signal (such as a synchronizing signal or the like), and a music signal. The music signal is subject to error correction processing, digital-to-analog conversion, and then is supplied as an audio signal to a speaker 8 through a low-pass filter.

Further, the driving portion 4 controls the photo pickup 6 so as to perform control such as focus control for focussing a laser beam onto the disk D, tracking control for causing the laser beam to follow a track on the disk D, optical-system feeding control for moving the optical pickup 6 in a radial direction relative to the disk D, etc.

A display and actuation portion 9 is constituted by various actuators for controlling the player, for example, a play switch for playing the music information recorded on the disk, a stop switch for stopping the playing, an introduction scanning switch for successively playing each of the head portions of the respective items of music information for a fixed time, a memory play switch for playing only the music information corresponding to the information stored in the memory, etc., and various display units such as a display unit for indicating that the actuators have been operated, a display unit for indicating the number and playing time of the music information which is being played, etc.

Referring to the flowcharts shown in FIGS. 2 and 3, the operation of the system shown in FIG. 1 will now be described hereunder.

First, referring to the flowchart of FIG. 2, description will be provided concerning the operation of selecting desired items of music information from the plurality of items of music information (hereinafter referred to as "tunes") recorded on the disk D and for storing information representing the selected tunes in a predetermined region of the working memory 3. In the following description, it is assumed that the disk D has already been loaded in the player, and a table of contents information (TOC) recorded in a read-in area of the disk D has been read out by the optical pickup 6 and stored in another predetermined region of the working memory 3. The TOC includes: the number of tunes recorded on the disk D; address information indicating positions of a leading end and a trailing end of each tune on the disk; item information indicating the playing time for each tune; and the total play time for all of the tunes, and so on.

Figure 2:
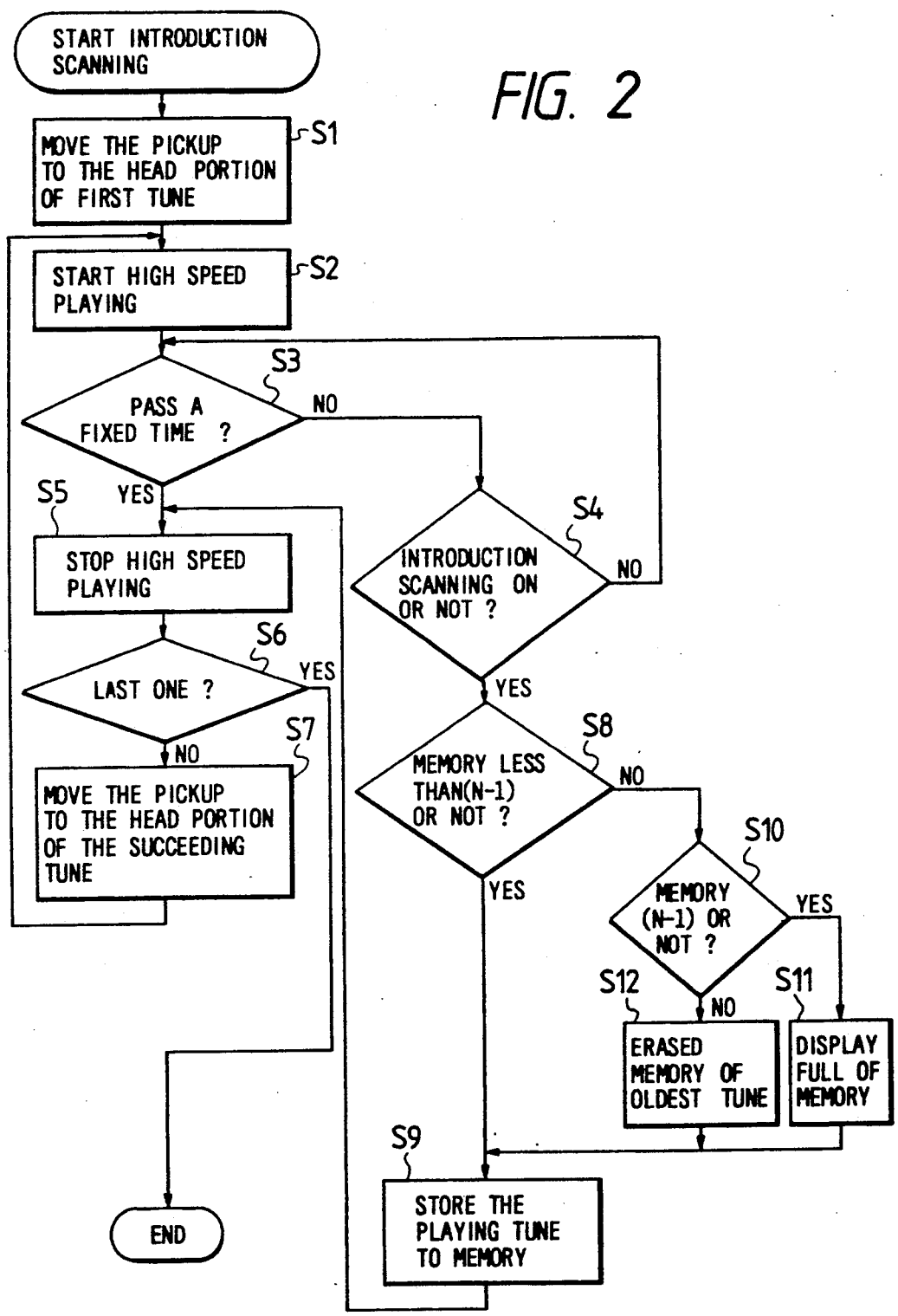

When the introduction scanning switch of the display and actuation portion 9 is depressed, an introduction scanning mode is started, as shown in FIG. 2. In general, during the introduction scanning mode, each of the respective head portions of all of the tunes recorded on the disk D is successively played for a fixed time (e.g., 10 seconds). More particularly, when this mode is selected, the processor 1 controls the driving portion 4 to cause it to move the pickup 6 to the head portion corresponding to the first recorded tune (in step S1) so that the playing of the first tune is started (in step S2). In step S2, the playing is performed at a speed which is higher than that during normal playback of tunes, but which is slow enough so that the contents of a tune can be recognized by an operator in the limited fixed time (e.g., 10 seconds). The high-speed playing of recorded program information (e.g., tunes) should be for a continuous portion of the tune so that an operator can readily determine if the operator wants to select that particular tune.

Next, it is determined whether or not a fixed time has passed (in step S3). Initially, it will not have, and therefore the process will proceed to step S4 where it is determined whether or not the introduction scanning switch has been depressed. Steps S3 and S4 will be repeatedly performed until the fixed time has passed. This is because the tune which is being played is considered to be selected, and therefore information representing the played tune is stored in the memory 3, only if the introduction scanning switch is depressed within the fixed time.

If the introduction scanning switch is not depressed within the fixed time, then it is considered that the played tune is not selected, and the high-speed playing is stopped (in step S5). A determination is then made as to whether or not the tune just played back in the fixed time is the last recorded tune (in step S6). If the tune is not the last one, then the pickup 6 is moved to the head position of the next tune (in step 7), and the next tune is played at the relatively high reproducing/playback speed (in step S2). If it is determined in step S6 that the tune just played back is the last recorded tune, then the introduction scanning mode is terminated.

If it is determined in step S4 that the introduction scanning switch has been depressed within the fixed time, then a storing process is executed for storing information, representing the tune being played back, in the memory 3. Now, assume that information representing N different tunes can be stored in the memory 3. A determination is made in step S8 as to whether or not the number of represented tunes already stored in the memory is less than (N−1). If the number is less than (N−1), then information representing the tune which is being played back at that time is stored in the memory 3 (in step S9). The operation of storing information (e.g., tune address information) into the memory 3 is performed in a manner so that the address information indicating the leading end position of the tune being played back is read out from the TOC information already stored in the memory 3, and the address information representing the tune is stored in a predetermined region in the memory 3 indicated by an address pointer.

When it is determined that the number of represented tunes already stored in the memory 3 is not less than (N−1) (in step S8), then a determination is made as to whether or not the number is equal to (N−1) in step S10. If the number is equal to (N−1), then the storage limit number N of the memory 3 will be reached upon completion of storage of address information representing the tune which is being played. This state (i.e., that the memory 3 is full) is displayed in the display and actuation portion 9 (in step S11), and then address information representing the tune which is being played is stored in the memory 3 (in step S9).

If in step S10 the number of represented tunes stored in memory 3 is not equal to (N−1), then the limit number N has already been reached. In this case, the oldest one of the tune address information stored in the memory 3 is searched and erased (in step S12), and the address information of the tune which is being played at that time is newly stored (in step S9). When the address information representing the tune which is being played has been completely stored, the process is shifted back to step S5 to repeat the process.

FIG. 3 is a flowchart for explaining the operation of the memory play mode in which the tunes corresponding to the address information stored in the memory 3 are successively played back.

After the memory mode is selected, a determination is made as to whether or not there exists any tune address information stored in the memory 3 (in step S20). If there are tune address information stored in the memory, then a determination is made as to whether or not the memory play mode has been selected for the first time after loading of the disk D (in step S21). If the memory mode has been selected for the first time, then the earliest one of the stored tune address information in the memory is searched, and then is pointed to by a pointer (in step S22). Next, the leading end address information, corresponding to the address information pointed to by the pointer, is read out from the TOC information stored in the memory 3 in step S23, and then the pointer is advanced (in step S24). A step 25 is then performed in which the pickup 6 is then moved to the head position of the tune to be played on the basis of the read-out leading end address information from step 23.

If it is determined, in step S21, that the selection of the memory play mode is not the first time after loading of the disk D, then the leading end address information of a recorded tune is read out for the address indicated by the pointer (in step S23), and the process starting with step S24 is executed.

In the above described process, when the memory play mode is selected again after it has been once released (or terminated), the playing of tunes is performed beginning with the next tune after the tune which was last played, so that even if the selection and release of the memory play mode is repeated again and again, the tune to be played is successively changed, and therefore the same tune is not played twice.

After the pickup 6 has been moved to the head position corresponding to the stored address of the tune to be played (in step S25), the playing of the recorded tune is started (in step S26). When the end of the tune is detected (in step S27), the playing is stopped (in the step S28). It is then determined whether or not the memory play mode is released (in step S29). If the memory play mode is not released, then the process is returned to step S23 so as to play the succeeding tune. If it is determined that the memory play mode is released (in step S29), then the memory play mode terminates.

If it is determined in step S20 that there are no tune address information stored in the memory, then information corresponding to N tunes are selected at random from the TOC information, and information representing the selected tunes are stored in the memory 3 (in step S30). The earliest one of the stored tune information is then searched (in step S22), and the process is shifted to step S23.

Although the above embodiment has been described as to the case where the introduction scanning switch is depressed so as to select the introduction scanning mode and the introduction scanning switch is depressed again during the introduction scanning mode so as to store information representing a tune which is being played, a separate switch, such as a memory switch, may be provided for initiating the storage of tune address information.

Further, although an embodiment has been described, by way of example, as to the case where the present invention is applied to a digital audio disk player, those skilled in the art will understand that the present invention is not limited thereto. For example, the present invention can be applied not only to a digital audio disk player but to other devices such as a digital audio tape recorder, or the like.

In conclusion, according to the record information reproducing system of the present invention, all of the items of program information recorded on a recording medium are successively reproduced, each for a fixed time at a speed which is greater than a normal reproducing/playback speed so that the contents of each item of program information can be sufficiently recognized by an operator within a fixed time of high speed reproduction. As a result, the selection of the items of program information can be performed in a relatively short time.

What is claimed is:

1. A method of storing information representing at least one data item selected for playback from a plurality of data items recorded on a recording medium, the method comprising the steps of:

playing back one of the plurality of recorded data items for a predetermined period of time at a fast playback speed which is greater than a normal playback speed used during normal playback of a data item to determine if the data item being played back is to be subsequently played back at the normal playback speed;

storing information representing the data item being played back in a memory only if the played back data item is to be subsequently played back; and repeating said playing back and storing steps for each of the plurality of recorded data items, whereby information representing each of the plurality of recorded data items which is to be subsequently played back is stored in the memory.

2. The method defined in claim 1, wherein said storing step is activated during the predetermined period of time.

3. The method defined in claim 1, wherein the information representing said data items is a position on the recording medium where the data item is recorded.

4. The method defined in claim 1, wherein the memory has a predetermined number N of address locations for storing the information representing data items to be subsequently played back, and wherein the method further comprises a first determining step of:

determining, each time information representing a data item is to be stored in one of the addresses of the memory, whether the memory contains information stored in less than N−1 of the address locations.

5. The method defined in claim 4, further comprising a second determining step, which is conducted only if the first determining step determines that there is not less than N−1 address locations of the memory containing information, for determining whether the memory contains N−1 address locations containing information.

6. The method defined in claim 5, further comprising the steps of:

erasing the oldest information stored in the memory only if the second determining step determines that there are not N−1 address locations of the memory which contain information; and displaying information indicating that the memory is full only if the second determining step determines that there are N−1 address locations of the memory which contain information.

7. The method defined in claim 1, further comprising the step of:

successively playing back recorded data items at the normal playback speed according to the information representing the selected data items stored in said memory.

8. A system for storing information representing at least one data item selected for playback from a plurality of data items recorded on a recording medium, the system comprising:
   means for playing back each one of the plurality of recorded data items for a predetermined period of time at a fast playback speed which is greater than a normal playback speed used during normal playback of a data item to determine if the data item being played back at the fast playback speed is to be subsequently played back at the normal playback speed; and
   means for storing information representing the data item presently being played back by said playing back means in a memory, said storing means being operable only if a played back data item is to be subsequently played back at the normal playback speed.

9. The system defined in claim 8, wherein the information representing said data items is a position on the recording medium where the data item is recorded.

10. The system defined in claim 8, wherein the memory has a predetermined number N of address locations for storing the information representing data items to be subsequently played back at the normal playback speed, and wherein the system further comprises:
   a first means for determining, each time information representing a data item is to be stored in one of the addresses of the memory, whether the memory contains information stored in less than $N-1$ of the address locations.

11. The system defined in claim 10, further comprising a second means for determining whether the memory contains $N-1$ address locations containing information, said second means being operable only if said first means determines that there is not less than $N-1$ address locations of the memory containing information.

12. The system defined in claim 11, further comprising:
   means for erasing the oldest information stored in the memory, said erasing means being operable only if the second means determines that there are not $N-1$ address locations of the memory which contain information; and
   means for displaying information indicating that the memory is full, said displaying means being operable only if the second means determines that there are $N-1$ address locations of the memory which contain information.

13. The system defined in claim 8, further comprising means for successively playing back recorded data items at the normal playback speed according to the information representing the selected data items stored in said memory.

* * * * *